(12) United States Patent
Nagai et al.

(10) Patent No.: US 8,131,143 B2
(45) Date of Patent: Mar. 6, 2012

(54) FOCUS CONTROL CIRCUIT FOR ADJUSTING THE FOCUS BY MOVING A LENS

(75) Inventors: Hiroki Nagai, Aichi (JP); Takeshi Kura, Ogaki (JP); Tomonori Kamiya, Ichinomiya (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/835,360

(22) Filed: Jul. 13, 2010

(65) Prior Publication Data

US 2011/0013899 A1 Jan. 20, 2011

(30) Foreign Application Priority Data

Jul. 15, 2009 (JP) ................................. 2009-167113
Jun. 3, 2010 (JP) ................................. 2010-127584

(51) Int. Cl.
*G03B 13/36* (2006.01)
*G03B 3/10* (2006.01)
(52) U.S. Cl. ........................ 396/135; 348/357
(58) Field of Classification Search .......... 396/135–136; 348/351
See application file for complete search history.

(56) References Cited

U.S. PATENT DOCUMENTS

| 5,448,329 | A | * | 9/1995 | Nakata | 396/104 |
| 5,745,804 | A | * | 4/1998 | Iwane | 396/93 |
| 5,956,528 | A | * | 9/1999 | Tanaka | 396/52 |
| 6,301,441 | B1 | * | 10/2001 | Kato | 396/131 |
| 6,535,691 | B1 | * | 3/2003 | Kobayashi | 396/136 |
| 7,864,239 | B2 | * | 1/2011 | Ikeda | 348/345 |
| 2002/0075395 | A1 | * | 6/2002 | Ohkawara | 348/347 |
| 2003/0012568 | A1 | * | 1/2003 | Ishikawa et al. | 396/104 |
| 2007/0280665 | A1 | * | 12/2007 | Nakahara | 396/121 |

FOREIGN PATENT DOCUMENTS

JP 2006-166403 6/2006

* cited by examiner

*Primary Examiner* — Clayton E LaBalle
*Assistant Examiner* — Leon W. Rhodes
(74) *Attorney, Agent, or Firm* — McDermott Will & Emery LLP

(57) ABSTRACT

A focus control circuit is installed in an image pickup apparatus including a lens, a driver element for adjusting the position of the lens, and a position detecting element for detecting the position of the lens. An equalizer included in the focus control circuit generates a drive signal used to adjust the position of the lens to a position to be set, based on a difference between the position of the lens identified by the position detecting element and the set position. When an instruction to vary a target position of the lens is received externally, a position setting unit included in the focus control circuit sets sequentially a plurality of positions in a range covering a new target position and a previous target position, to the equalizer before the new target position is reached from the previous target position.

5 Claims, 4 Drawing Sheets

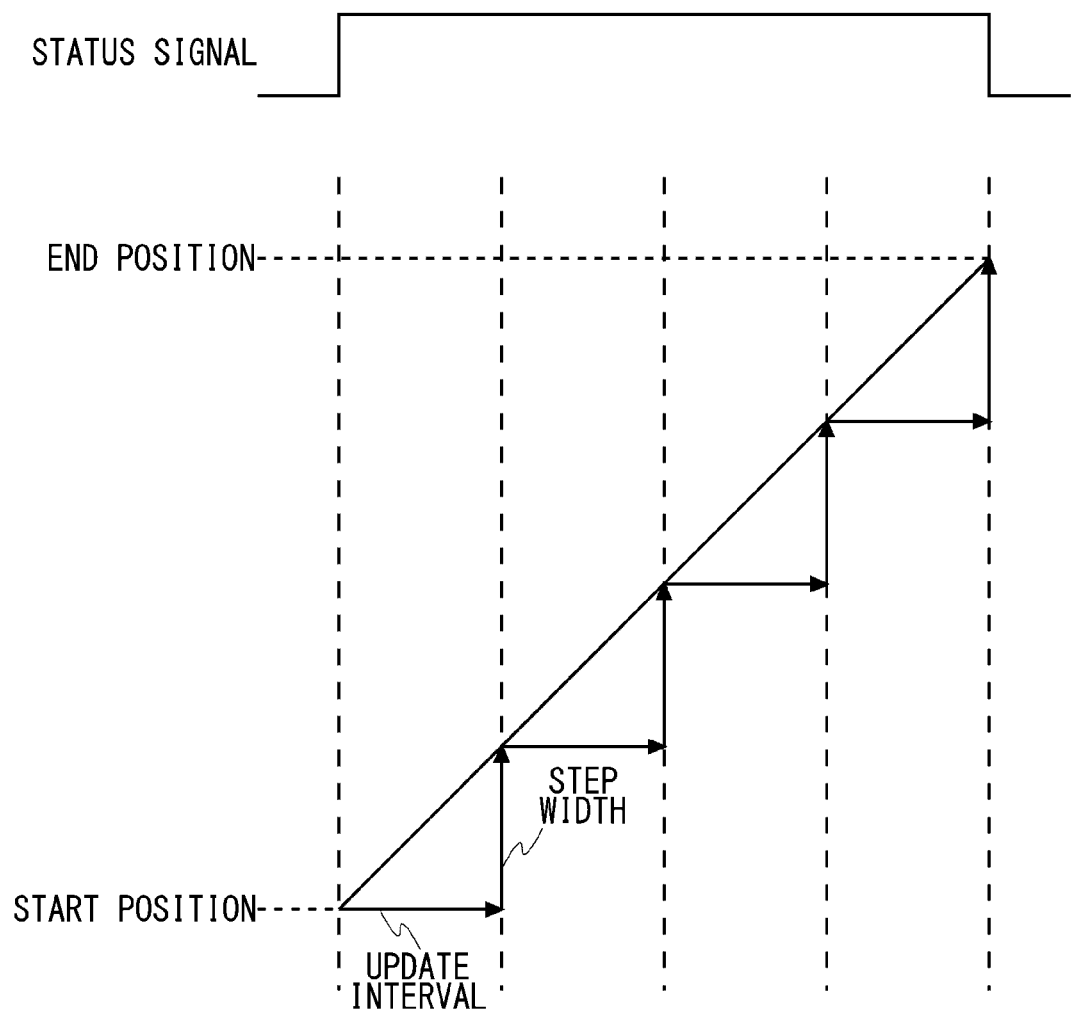

FOCUS CONTROL CIRCUIT FOR ADJUSTING THE FOCUS BY MOVING A LENS

CROSS-REFERENCE TO RELATED APPLICATIONS

This application is based upon and claims the benefit of priority from the prior Japanese Patent Applications No. 2009-167113, filed on Jul. 15, 2009, and Japanese Patent Application No. 2010-127584, filed on Jun. 3, 2010, the entire contents of which are incorporated herein by reference

BACKGROUND OF THE INVENTION

1. Field of the Invention

The present invention relates to a focus control circuit for determining the focus position by actively moving a lens.

2. Description of the Related Art

Most of camera modules installed in commonly-used digital cameras and mobile phones are provided with auto-focusing functions. A contrast detecting method is often used as the auto-focusing function employed in such a compact-size camera. In the contrast detecting method, a lens position in which the contrast of a subject lying in a picked-up image frame is maximized is detected by actively moving the lens and then the lens is moved to the detected position.

SUMMARY OF THE INVENTION

The contrast detecting method can be achieved with less cost than an active method in which the subject is irradiated with infrared rays or ultrasonic waves and the distance to the subject is measured based on the reflected waves. Nevertheless, the contrast method has a drawback in that it takes some time to complete a search for the lens position in which the contrast of a subject is maximized. It is desired that the processing of focusing the subject be completed within one second after a user has pressed a shutter button halfway.

The number of pixels of each camera module installed in the commonly-used digital cameras and mobile phones is increasing every year. As a result, high-resolution images can be easily taken with such a compact-size camera. When the high-resolution images are taken, out-of-focus shots may be easily noticeable and therefore further high-precision auto-focus control is required.

A focus control circuit according to one embodiment of the present invention is installed in an image pickup apparatus including a lens, a driver element for adjusting the position of the lens, and a position detecting element for detecting the position of the lens, and the focus control circuit includes: an equalizer configured to generate a drive signal used to adjust the position of the lens identified by an output signal of the position detecting element to a position to be set, based on a difference between the position of the lens identified thereby and the set position and configured to control the driver element; and a position setting unit configured to sequentially set a plurality of positions in a range covering a new target position and a previous target position, to the equalizer before the new target position is reached from the previous target position, when an instruction to vary the target position of the lens is received externally.

Another embodiment of the present invention relates to an image pickup apparatus. This apparatus comprises: a lens; image pickup devices configured to convert light transmitted through the lens into an electric signal; a driver element configured to adjust the position of the lens; a position detecting element configured to detect the position of the lens; and the above-described focus control circuit.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 4 is a diagram to explain a parameter which is set to a position setting circuit by an image signal processor.

DETAILED DESCRIPTION OF THE INVENTION

The invention will now be described by reference to the preferred embodiments. This does not intend to limit the scope of the present invention, but to exemplify the invention.

Figure 1:
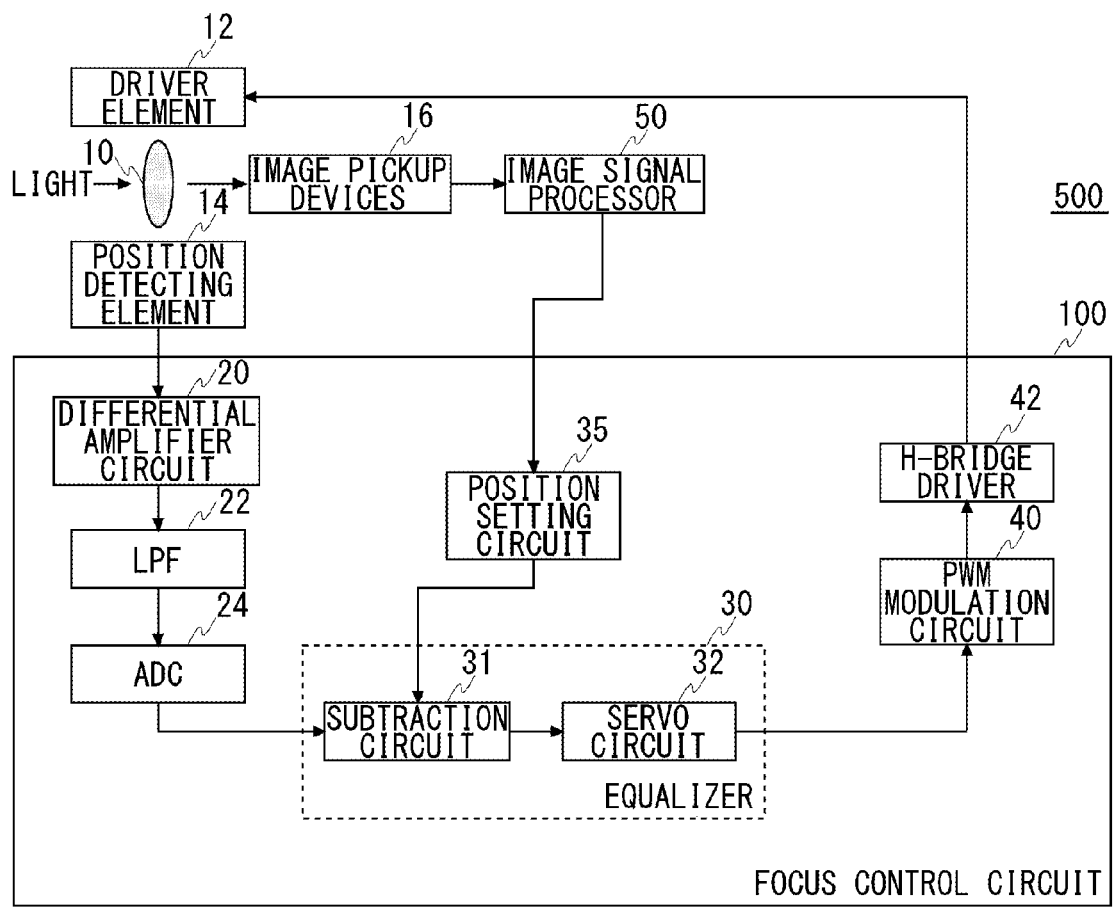
FIG. 1 illustrates a structure of an image pickup apparatus provided with a focus control circuit according to an embodiment of the present invention.

FIG. 1 illustrates a structure of an image pickup apparatus 500 provided with a focus control circuit 100 according to an embodiment of the present invention. The image pickup apparatus 500 includes a lens 10, a driver element 12, a position detecting element 14, image pickup devices 16, an image signal processor (ISP) 50, and a focus control circuit 100. Other structural components, such as an image coding engine and a recording medium, which are not involved in the auto-focus control are omitted in FIG. 1.

The image pickup devices 16 convert the light signals transmitted through the lens 10, which is an optical component, into electric signals and outputs the electric signals to the image signal processor 50. The image pickup devices 16 may be CCD (charge-coupled device) sensors or CMOS (complementary metal-oxide semiconductor) image sensors.

The driver element 12, which is an element used to adjust the position of the lens 10, moves the lens 10 along an optical direction in response to a drive signal supplied from the focus control circuit 100. Thereby, the focal lengths of the lens 10 and the image pickup devices 16 are adjusted. The driver element 12 may be a voice coil motor (VCM).

The position detecting element 14 is an element used to detect the position of the lens 10. A hall element may be used as the position detecting element 14. A description is given hereinbelow of an example where the driver element 12 and the position detecting element 14 are configured by an actuator comprised of a voice coil motor and a hall element.

The image signal processor 50 processes image signals outputted from the image pickup devices 16. In the present embodiment, the image signal processor 50 principally determines a just-focused position of the lens 10, based on the image signals outputted from the image pickup devices 16.

Figure 2:
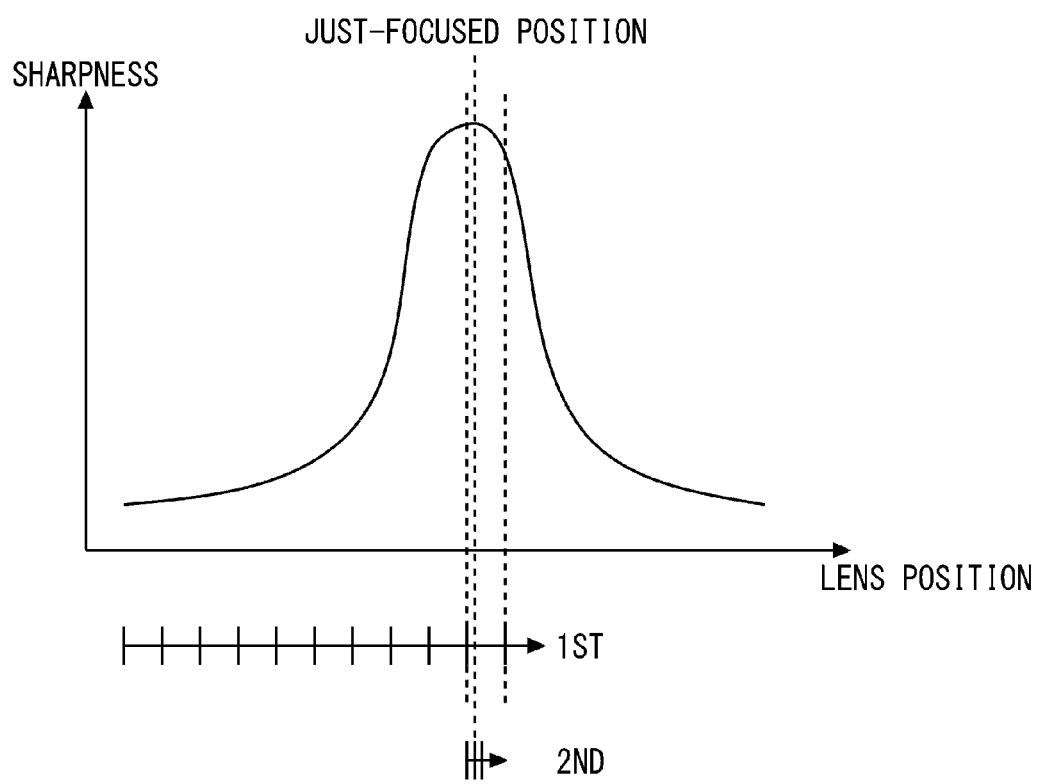
FIG. 2 is a graph to explain a processing, performed by an image signal processor, to determine a just-focused position of a lens.

FIG. 2 is a graph to explain a processing, performed by the image signal processor 50, to determine a just-focused position of the lens 10. As an auto-focusing function, such as a shutter button being half push state, is activated, the image signal processor 50 transmits a control signal by which to move the lens stepwise at a predetermined step width, to the focus control circuit 100. In so doing, the image signal processor 50 calculates the sharpness of each image signal picked up in each target position of the lens 10. For example, the sharpness thereof may be obtained and evaluated in such a manner that an edge component of each image signal is extracted by subjecting the image signal to a high-pass filter and then the edge component of each image signal is accumulated. The image signal processor 50 determines the position of the lens 10 where the sharpness becomes maximum, to be a just-focused position.

FIG. 2 illustrates an example where the just-focused position is determined by a two-step scan. In a first-step scan, the position of the lens 10 is coarsely varied so as to narrow down the just-focused position within a certain limited range. More specifically, a range between a target position A and a target position B, which is immediately before the target position A, is identified as a range having the just-focused position of the lens 10. Here, the target position A is a turning position at which the increasing sharpness begins to decrease. In a second-step scan, the position of the lens 10 is now finely varied within the limited range narrowed down by the first step, and the position of the lens 10 where the sharpness becomes maximum is determined to be the just-focused position. With this two-step scan, the just-focused position can be searched at high speed and with high precision.

Referring back to FIG. 1, the focus control circuit 100 includes a differential amplifier circuit 20, a low-pass filter 22, an analog-to-digital converter (ADC) circuit 24, an equalizer 30, a position setting circuit 35, a PWM modulation circuit 40, and an H-bridge driver 42. If the focus control circuit 100 is implemented on a single-chip LSI, the low-pass filter 22 may be provided external to the single-chip LSI.

The differential amplifier circuit 20 amplifies the potential difference between the output terminals of the position detecting element 14 (i.e., the hall element), and outputs it as a position signal. The hall element outputs a voltage proportional to the magnetic flux density of magnetic field formed by the magnet provided with the lens 10. As the magnetic flux density varies due to a movement of the lens 10, the output voltage of the hall element varies in proportion to the variation in magnetic flux density. Thus, the position of the lens 10 can be estimated based on the output voltage of the hall element.

The low-pass filter 22 removes the high-frequency components of the position signal outputted from the differential amplifier circuit 20. The analog-to-digital converter circuit 24 converts the position signal from analog values into digital values.

The equalizer 30 generates a drive signal with which to align the position of the lens 10 to a position set by the position setting circuit 35, based on a difference between the current position of the lens 10 identified by the output signal of the position detecting element 14 and the position of the lens 10 set by the position setting circuit 35, and thereby controls the driver element 12.

A more detailed description will now be given here. The equalizer 30 includes a subtraction circuit 31 and a servo circuit 32. The subtraction circuit 31 calculates the difference between the position signal outputted from the position detecting element 14 and the position signal set by the position setting circuit 35, and then outputs the calculated difference to the servo circuit 32 as deviation signal. If the position of the lens 10 is in the position set by the position setting circuit 35, the deviation signal will be zero. The servo circuit 32 generates a signal used to cancel out the deviation signal outputted from the subtraction circuit 31, and outputs the thus generated signal to the PWM modulation circuit 40.

As an auto-focusing function is activated, the image signal processor 50 outputs a control signal by which to sequentially change the position of the lens 10, to the position setting circuit 35 via an interface such as an I2C interface The PWM modulation circuit 40 converts a signal inputted from the equalizer 30, into a pulse signal having a duty ratio that corresponds to the digital value thereof. The H-bridge driver 42, which includes at least four transistors therein, turns on two transistors along a diagonal line, so that the current can be delivered to the aforementioned voice coil motor. Also, the H-bridge driver 42 turns on the other two transistors along another diagonal line, so that the direction of current flowing to the voice coil motor can be opposite.

The H-bridge driver 42 delivers the current to the voice coil motor in the direction of current and with the amount of current flow that both correspond to the pulse signal inputted from the PWM modulation circuit 40, and thereby moves the voice coil motor by a predetermined distance and toward a predetermined direction. As a result, the lens 10 can be moved to the target position so as to adjust the focus properly.

As the position setting circuit 35 receives an instruction to vary the target position of the lens 10, from the image signal processor 50, the position setting circuit 35 sequentially sets a plurality of positions in a range covering a new target position and a previous target position, to the equalizer 30 before the new target position is reached from the previous target position. More specifically, the position setting circuit 35 generates a plurality of positions that increase in stages, in order to progressively move the lens 10 to a new target position from a previous target position. And the position setting circuit 35 sequentially sets the thus generated plurality of positions to the equalizer 30. Hereinafter, an operation involving a series of these processings will be referred to as "step-move operation". Note here that, in order to move the lens 10 in the opposite direction, the position setting circuit 35 generates a plurality of positions that decrease in stages and sequentially sets the thus generated plurality of positions to the equalizer 30.

The range within which the aforementioned plurality of positions are generated is not a range strictly segmentalized or divided between a previous target position and a new target position but a range that contains the vicinities of the previous target position and the new target position. For example, the last position of the aforementioned plurality of positions may be a position beyond the new target position.

Figure 3:
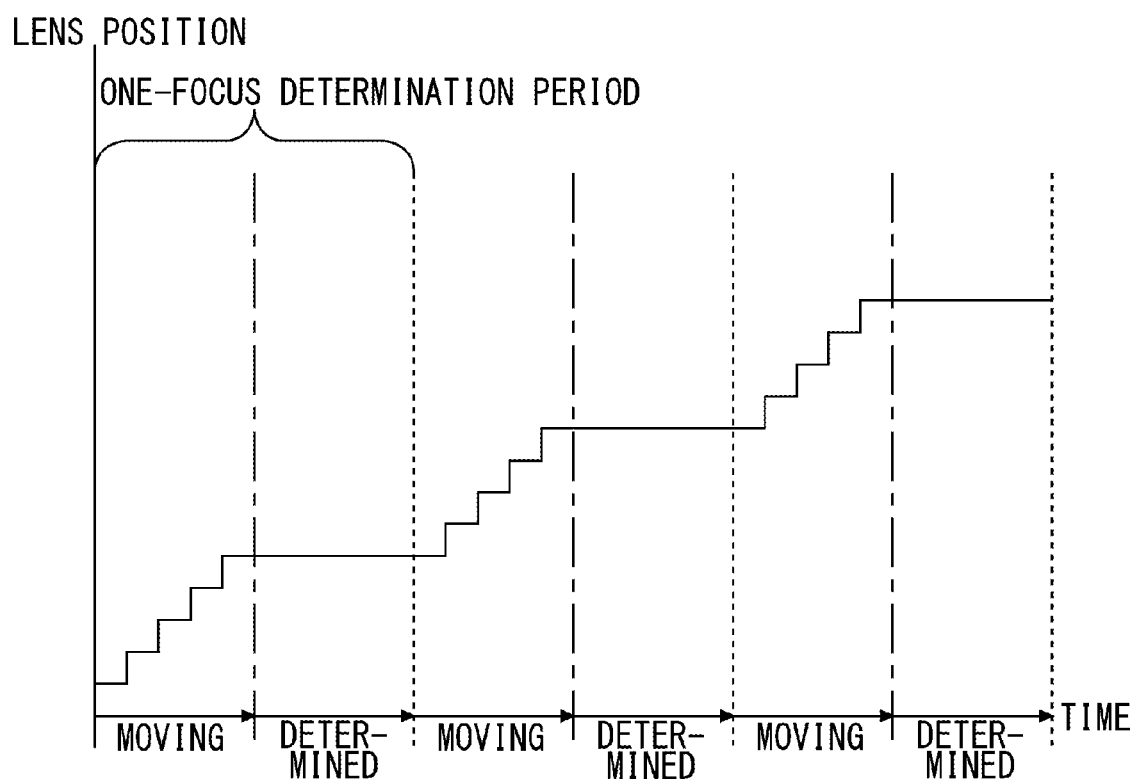
FIG. 3 illustrates an exemplary transition where a position, which is set to an equalizer by a position setting circuit, shifts from one position to another.

FIG. 3 illustrates an exemplary transition where the position, which is set to the equalizer 30 by the position setting circuit 35, shifts from one position to another. Considered here is an example of transition where the position shifts in the above-described first-step scan. As described above, the image signal processing unit 50 calculates the sharpness for each target position of the lens 10. That is, a set of processing is constituted by (1) one-time movement from a previous target position to a new target position and (2) the calculation and determination of the sharpness. This each set of processing is repeated, so that the position where the sharpness becomes maximum can be identified.

The above-described each set of processing must be executed within a predetermined one-focus determination period. If a new target position is set to the equalizer 30 with the lens 10 positioned in a previous position, the lens 10 will receive a large drive force and therefore the lens 10 will move precipitously. In this case, it takes longer time for the lens 10 to come to a complete stop at the new target position. Thus, in this case, it is highly likely that the calculation and determination of the sharpness cannot be completed within the one-focus determination period.

In the light of this, according to the present embodiment, the lens 10 is moved by the above-described step-move operation to slowly move the lens 10. As a result, the lens 10 can be moved progressively, as shown in FIG. 3, in a movement period of the aforementioned one-focus determination period.

FIG. 4 is a diagram to explain a parameter which is set to the position setting circuit 35 by the image signal processor 50. FIG. 4 illustrates the transition of the lens position in a movement period of the aforementioned one-focus determination period. A status signal becomes significant (goes high) when the step-move operation is executed, whereas the status signal becomes non-significant (goes low) when the step-move operation is not executed. The image signal processor 50 starts the step-move operation by setting the status signal to a high level. As the step-move operation has been completed, the position setting circuit 35 sets the status signal to a low level.

Whenever the target position of the lens 10 is changed, the image signal processor 50 transmits a start position, an end position, step width and an update interval, to the position setting circuit 35 as the aforementioned control signal. Every time the target position of the lens 10 is changed, the position setting circuit 35 receives the start position, the end position, the step width and the update interval from the image signal processor 50, and then generates a position, which is set to the equalizer 30, based on the start position, the end position, the step width and the update interval received.

A more detailed description will now be given here. First, the position setting circuit 35 sets the start position to the equalizer 30. As the update interval has elapsed after the setting of the start position, the position setting circuit 35 sets a position, in which the step width is added to the start position, to the equalizer 30. As another update interval has elapsed after the setting of the position, the position setting circuit 35 sets a position, in which the step width is added to said position, to the equalizer 30. Similarly, this processing is repeated until the position set to the equalizer 30 reaches the end position. If the end position is set to the equalizer 30, the position setting circuit 35 will terminate one-time step-move operation. Note that if the position set to the equalizer 30 does not agree with the end position, the position setting circuit 35 will set a position, which lies adjacent to this position and also lies beyond the end position, to the equalizer 30 and terminate the one-time step-move operation.

If the end position of the previous step-move operation is identical to the start position of the current step-move operation, the image signal processor 50 can skip the supply of the start position to the position setting circuit 35. Also, if the step width and the update interval in the previous step-move operation are identical to the step width and the update interval of the current step-move operation, the image signal processor 50 can skip the supply of the step width and the update interval to the position setting circuit 35.

Also, the image signal processor 50 is capable of setting polarity information (e.g., polarity bit) in the step width. If the polarity information is set in the received step width, the position setting circuit 35 will update the position to be set to the equalizer 30, in a direction according to the polarity information. If the polarity information is not set in the received step width, the position setting circuit 35 will update the position to be set to the equalizer 30, in a predetermined direction.

By employing the present embodiment as described above, the processing time can be reduced without deteriorating the focusing accuracy, in the auto-focus control that determines the focus position by actively moving the lens. In other words, when the lens 10 is moved from a previous target position to a new target position, a plurality of position signals that vary in stages are sequentially inputted to the equalizer 30. Thus, the lens 10 can be progressively moved to a new target position. As a result, the lens 10 moves moderately and therefore the time it takes for the lens 10 to come to a complete stop at a new target position can be reduced.

In this regard, if the time it takes for the movement of the lens 10 to come to a complete stop as a result of focusing becomes longer, the calculation and determination of the sharpness will be done while the lens 10 is not yet focused on a target position or one must wait until the lens 10 is focused on a target position and has come to a complete stop. In the former case, the focusing accuracy is compromised, while in the latter case the processing time may increase.

Also, a plurality of positions to be set to the equalizer 30 are not generated and set by the image signal processor 50 in one-focus determination period. Instead, a plurality of positions to be set to the equalizer 30 are generated and set by the position setting circuit 35 in one-focus determination period, so that the processing time can be reduced as compared with the case where they are generated and set by the image signal processor 50. If in particular the position setting circuit 35 is configured by an exclusive-use hardware, the processing time can be significantly reduced as compared with software processing implemented.

Also, since the sharpness is calculated with the lens 10 focused on each target position, the high-accuracy sharpness can be calculated. The focus position is determined based on the high-accuracy sharpness, so that the focusing accuracy can be improved.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

Also, in the above-described embodiments, a description is given of an example where the above-described step-move operation is applied to the above-described first-step scan. In a modification, the step-move operation may be applied to the above-described second-step scan. Also, in the above-described embodiments, a description is given of an example where the focusing position is determined using the two-step scan. In a modification, a single scan method may be used instead of the scan divided into a plurality of steps. Or a method employing three or more steps of scanning may be used. The step-move operation is applicable to any of the above-described various types of scanning.

In the above-described embodiments, a voice coil motor is used for the driver element 12. However, this should not be considered as limiting and, for example, a piezo element, a stepping motor or the like may be used for the driver element 12. A hall element is used as the position detecting element 14 but an MR element, a photo screen diode or the like may be used for the position detecting element 14. The PWM modulation circuit 40 and the H-bridge driver 42 are used as a driver circuit for driving the driver element 12. If, however, a driver element driven by analog signals instead of pulse signals is to be used, a digital-to-analog converter circuit and an amplifier circuit will be used as the driver circuit.

What is claimed is:

1. A focus control circuit for an image pickup apparatus including:
   a lens;
   an image pickup device configured to convert light transmitted through said lens into an electric signal;
   a driver element for adjusting the position of the lens;

a position detecting element for detecting the position of the lens; and an image signal processor configured to process an image signal output from the image pickup device, the focus control circuit including:

an equalizer configured to generate a drive signal used to adjust the position of the lens identified by an output signal of the position detecting element to a position to be set, based on a difference between the identified position of the lens and the set position, and configured to control the driver element; and a position setting unit configured to sequentially set a plurality of positions of the lens in a range covering a new target position and a previous target position, to said equalizer before the lens reaches the new target position from the previous target position, when an instruction to vary a target position of the lens is received from the image signal processor, wherein the position setting unit is configured as a hardware circuit.

2. A focus control circuit according to claim 1, wherein said position setting unit generates a plurality of positions, which increase or decrease in stages, with which to progressively move the lens to the new target position from the previous target position and sets the plurality of positions generated to said equalizer.

3. A focus control circuit according to claim 1, wherein said position setting unit receives externally a start position, an end position, step width and an update interval whenever the target position of lens is changed, and said position setting unit generates a position set to said equalizer, based on the start position, the end position, the step width and the update interval.

4. A focus control circuit according to claim 3, wherein polarity information is settable in the step width, and wherein when the polarity information is set in the step width, said position setting unit updates the position to be set to said equalizer, in a direction according to the polarity information; and when the polarity information is not set in the step width, said position setting unit updates the position to be set to said equalizer, in a predetermined direction.

5. An image pickup apparatus, comprising:

a lens;

image pickup devices configured to convert light transmitted through said lens into an electric signal;

a driver element configured to adjust the position of said lens;

a position detecting element configured to detect the position of said lens; and a focus control circuit according to claim 1.

* * * * *